UNITED STATES PATENT OFFICE.

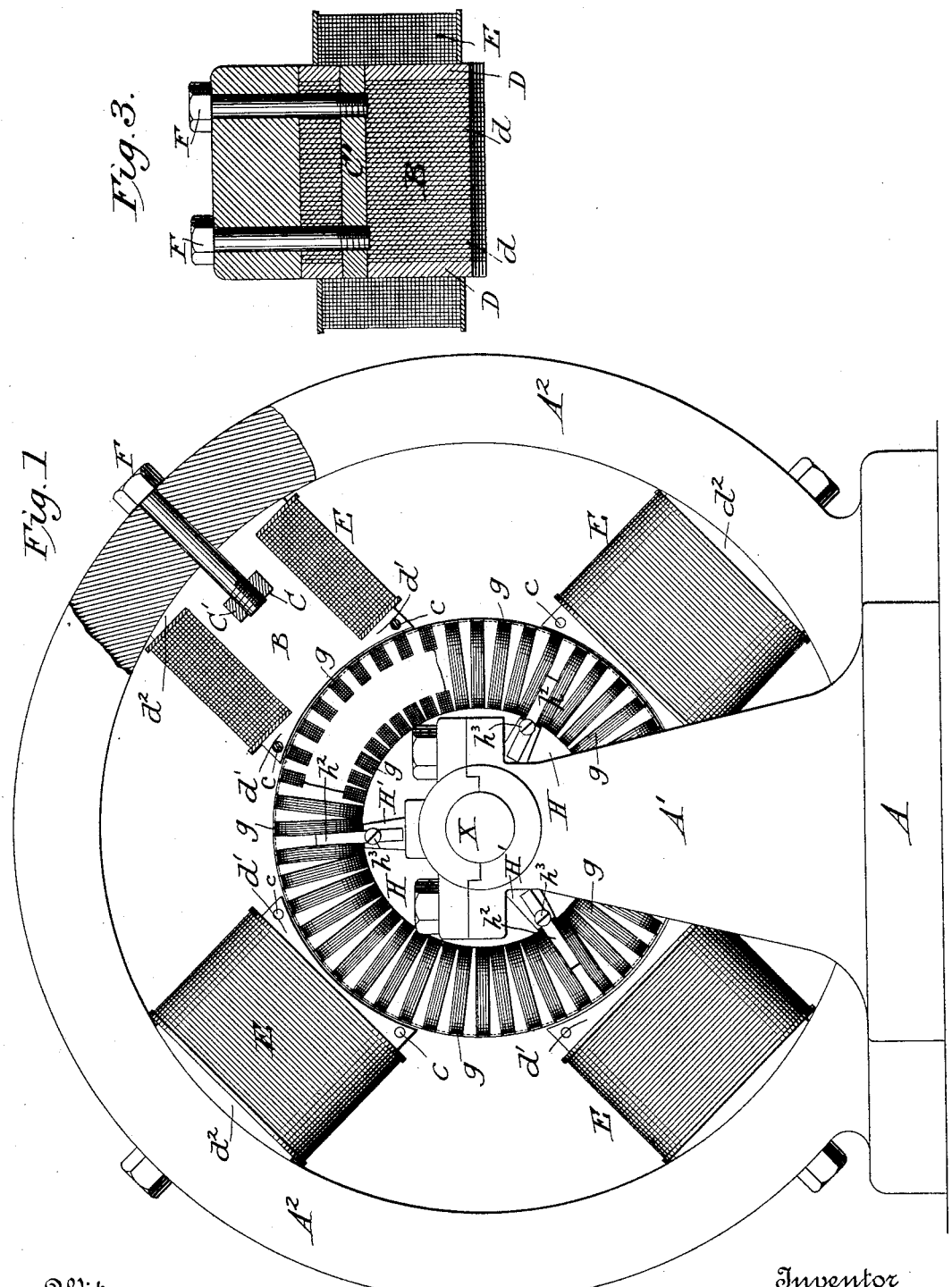

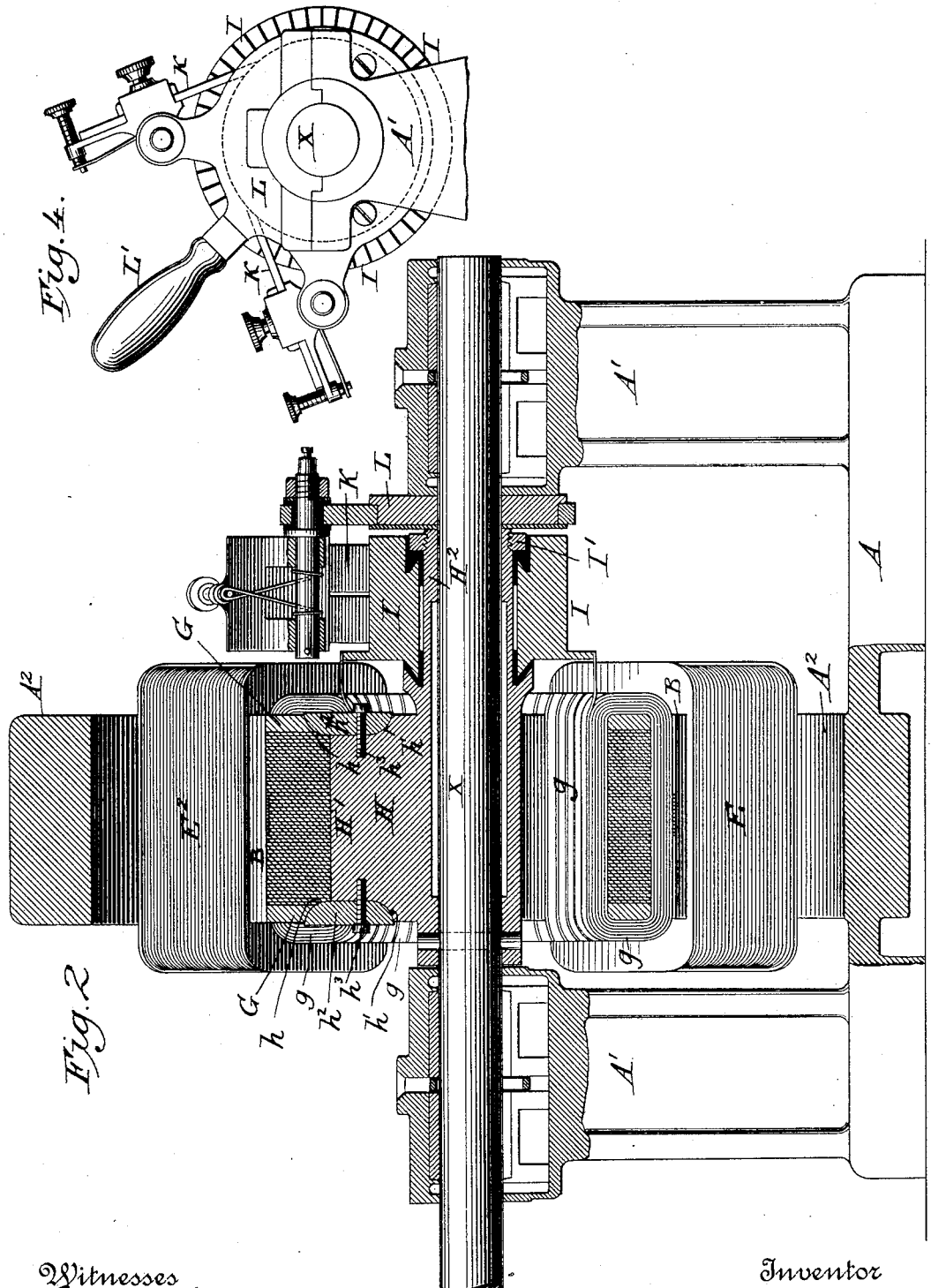

ALBERT L. PARCELLE, OF BOSTON, MASSACHUSETTS.

ELECTRIC MOTOR AND DYNAMO.

SPECIFICATION forming part of Letters Patent No. 463,704, dated November 24, 1891.

Application filed April 2, 1891. Serial No. 387,378. (No model.)

*To all whom it may concern:*

Be it known that I, ALBERT L. PARCELLE, a citizen of the United States, residing at Boston, in the State of Massachusetts, have invented certain new and useful Improvements in Electric Motors and Dynamos, of which the following is a specification.

The object of my invention is to produce an efficient dynamo-electric machine at a minimum cost.

To this end the invention consists, first, in certain improvements in the construction of the field-magnet. I employ an iron yoke and connect therewith field-poles formed of laminæ, each of which is provided with projections that serve to form an enlarged area of contact between the pole-piece and the iron yoke, so as to reduce the magnetic resistance to a minimum. The laminæ are secured together by a bar or nut passing transversely through them and into which a bolt or bolts passing through the yoke screw.

Second. The next part of my invention relates to the armature. As shown, I employ a ring armature mounted upon and carried by a brass spider or flanged hub. The invention consists in the manner of attaching the armature to the hub or spider, which is as follows: At the point where the armature is connected to a wing or radial arm of the spider I cut in the iron armature-ring and in the arm of the spider a seat or socket, into which a coupling-iron plate or bar is seated and secured in place, thus forming an interlocking connection between the metal of the armature-ring and the spider. This iron coupling-bar occupies the place of the iron cut from the armature-ring, so that there is no reduction of metal in the armature.

In the accompanying drawings, Figure 1 is an end elevation of my improved machine, partly in section; Fig. 2, a vertical longitudinal section; Fig. 3, a detail longitudinal section through one of the field-magnet coils and cores, and Fig. 4 a detail end elevation showing the commutator and its brushes.

The base A, standards A', and the field-magnet ring-yoke $A^2$ are all shown cast in one piece. This is a construction specially applicable to small motors. The field-magnet cores B are made up of thin plates $d$, punched out of sheet-iron. The shape of the plates is seen in Fig. 1, where it will be seen that they are formed with polar extensions $d'$ and with similar extensions $d^2$ at the rear end. The front edges of the plate are curved to conform to the armature and the rear edges are curved to conform to the turned or bored interior of the yoke $A^2$. Each plate is formed with a rectangular hole C toward the end of the plate next to the yoke, and smaller holes $c$ are formed in the polar extensions. The outer plates D of the assemblage of plates forming a core are made relatively thick, as shown. The plates are insulated by varnishing or by the use of thin sheets of paper or in any of the usual ways, and are secured together by rivet-bolts passed through the holes $c$ and by a rivet-bar C', passed through the rectangular hole C. The field-magnet coil E may now be wound upon the core, the extensions $d'$ and $d^2$ forming seats for the wire. The rivet-bar C', which is preferably of iron, is provided with two screw-threaded holes, and holes are tapped through the yoke and into the rear end of the core, coinciding in alignment with the screw-threaded sockets in the bar C'. Bolts F, having threaded ends, pass through the apertures in the ring and screw into the sockets in the bar C'. The extensions $d^2$ furnish a large area of contact and a good magnetic connection between the core and yoke. The small holes through the polar extensions $d'$ do not materially reduce the plates at those points, as the iron is wider at the ends of these extensions.

The armature is made up of toothed rings punched from sheet-iron and set up with intervening insulation and exterior plates G of relatively greater thickness. The armature-coils $g$ are wound thereon, as usual, and the armature-plates are riveted together, as is commonly practiced. The brass hub H, mounted upon and keyed to the armature-shaft X, is shown in this instance as having three radial wings or arms H'. Opposite the ends of these wings and between the armature-coils a seat or socket $h$ is cut into the armature-ring on each side. Each socket extends from the inner edge of the armature-ring outwardly, and in depth is preferably little, if any, deeper than the thickness of the outside plate G. A similar socket $h'$ is cut in each side of the radial arm H'. Into the seat on each side formed by the sockets $h\ h'$ is set an iron coupling bar, key, or plate $h^2$, which is firmly secured in place by a screw $h^3$ passing through it and screwing into the radial arm $H'$. The iron coupling-bars $h^2$ replace the metal cut from the armature-ring, and as the sockets in which they are seated need not extend into the laminated part of the armature-ring there is no impairment of the efficiency of the metal in the armature. The construction affords an interlocking joint of great strength, which permits of the ready separation and assemblage of the parts. As seen in Fig. 1, the radial arms $H'$ are reduced in thickness where they pass between the coils, and the coupling-bar $h^2$ is also made narrow, so that there will be the least possible separation of the armature-coils.

The hub H is elongated on one side, as indicated at $H^2$, and is formed with a seat for the commutator-bars I, that are suitably insulated, as shown, and are held in place by a nut $I'$, screwing upon the end $H^2$ of the hub. The commutator-brushes K, of any suitable construction, are mounted upon a collar L, interposed between the end of the hub and the bearing of the shaft, and having a handle $L'$, by means of which the brushes may be adjusted. The bearings of the shaft in the standards $A'$ are, as shown, self-oiling bearings of a usual construction.

I claim as my invention—

1. The combination, with the yoke, of a laminated core, the bar $C'$, passing through the laminations of the core, and a securing bolt or bolts passing through the yoke and into said bar.

2. The combination, with an iron yoke, of a laminated core the laminæ of which are each formed with projections or extensions $d^2$ to form a joint of enlarged area between the yoke and the core, and devices constructed and arranged to secure the laminated core to the yoke.

3. The combination of the hub or spider of non-magnetic material, the ring armature, the socket in the side of the armature and in the side of the spider, and an iron coupling-bar seated in said sockets.

4. The combination of the armature-shaft, a brass hub or spider mounted thereupon, the radial spider-arms, the ring armature, sockets formed in the side of the ring armature and in the sides of the spider-arms, and iron coupling bars or keys secured in said sockets, whereby a firm interlocking connection is afforded between the spider and armature without impairing the laminations of the armature or reducing the metal therein.

In testimony whereof I have hereunto subscribed my name.

ALBERT L. PARCELLE.

Witnesses:
 CONRAD RENO,
 ROBERT WALLACE.